United States Patent [19]
Bilbrey et al.

[11] 3,864,828
[45] Feb. 11, 1975

[54] CABLE SCRIBING TOOL

[75] Inventors: Robert A. Bilbrey, Orinda; Walter J. Maytham, Los Altos, both of Calif.

[73] Assignee: Speed Systems, Inc., Los Altos, Calif.

[22] Filed: Apr. 30, 1973

[21] Appl. No.: 355,958

[52] U.S. Cl................. 30/91.2, 30/164.9, 85/9.5 R
[51] Int. Cl........................................... B26b 27/00
[58] Field of Search ........ 30/91.2, 90.7, 90.8, 91.1, 30/90.1, 164.9; 81/9.5 R, 9.5 B

[56] References Cited
UNITED STATES PATENTS

| | | | |
|---|---|---|---|
| 562,097 | 6/1896 | Rieckel | 30/90.7 |
| 2,659,140 | 11/1953 | Davison | 30/91.2 X |
| 3,169,315 | 2/1965 | Mankovitz | 30/91.2 X |
| 3,204,495 | 9/1965 | Matthews | 81/9.5 R |
| 3,665,603 | 5/1972 | Bilbrey et al. | 30/90.7 |

FOREIGN PATENTS OR APPLICATIONS

| | | | |
|---|---|---|---|
| 602,245 | 12/1925 | France | 30/91.1 |

*Primary Examiner*—Al Lawrence Smith
*Assistant Examiner*—J. T. Zatarga
*Attorney, Agent, or Firm*—Phillips, Moore, Weissenberger, Lempio & Strabala

[57] ABSTRACT

A tool for scribing the outer layer of a cable includes first and second pivotally connected arms, between which cables of varying diameters may be positioned. A leaf spring interconnects the arms for urging them relatively together, to seat the cable relative to one arm and to bring a scribing blade associated with the other arm into engagement with the surface of the cable. In such state, the tool may be rotated about the cable, so that the scribing blade cuts into the outer portion of the cable. Jack means are associated with the tool for selectively spreading the arms apart against the resilience of the leaf spring, to allow insertion or removal of the cable relative to the tool.

4 Claims, 7 Drawing Figures

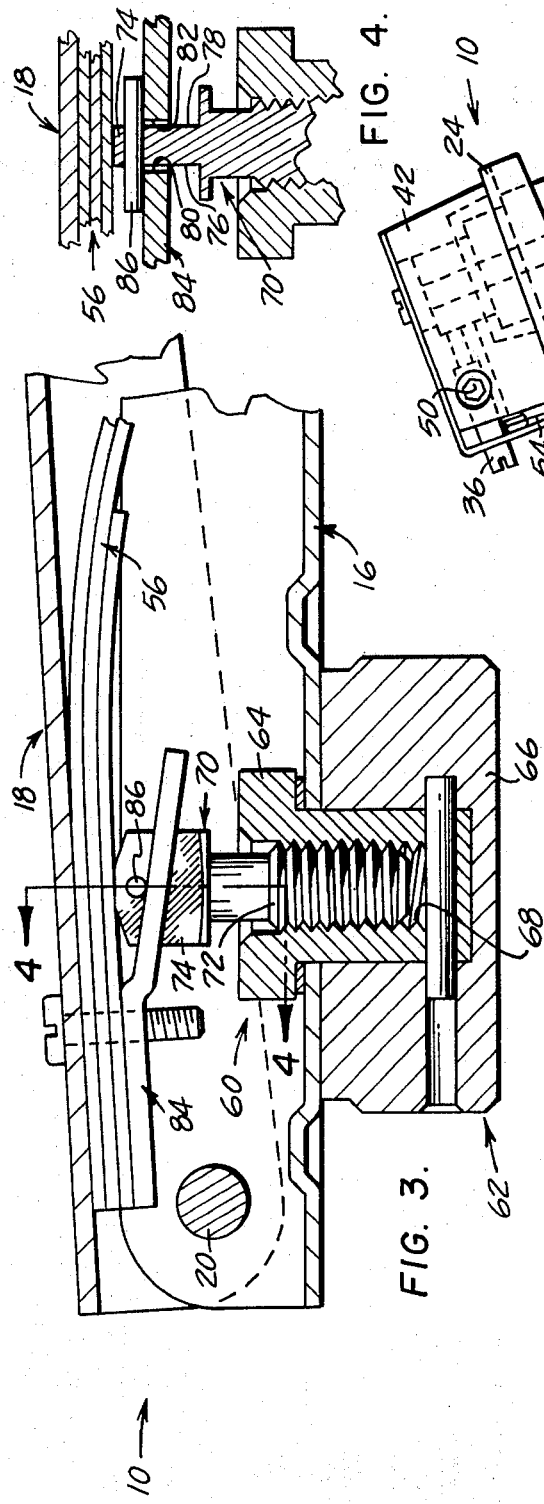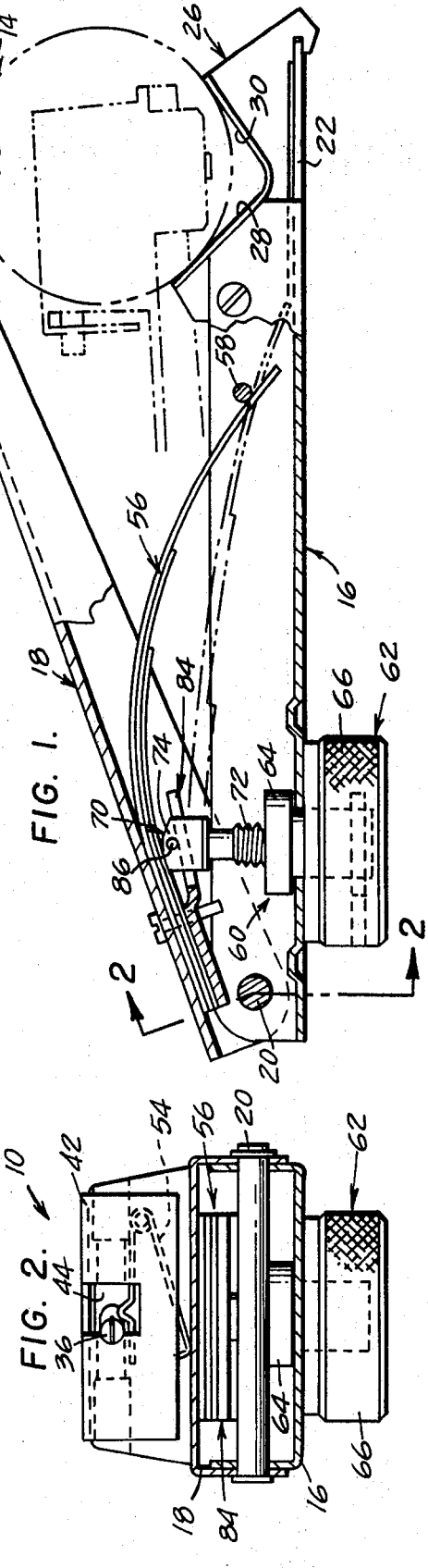

3,864,828

CABLE SCRIBING TOOL

BACKGROUND OF THE INVENTION

This invention relates to cable scribing tools, and more particularly to such tools which may be adapted for use with cables of various diameters.

In providing a tool for scribing the outer layer of electrical cable (such outer layer being, for example, of semi-conductor material), a number of requirements should be filled. For example, the tool should advantageously be capable of receiving various diameter electrical cables, without a loss of efficiency in the use of a tool. In addition, the tool should be extremely simple in design and convenient for use. And, of course, the tool should be effective.

SUMMARY OF THE INVENTION

It is an object of this invention to provide a cable scribing tool which is capable of properly scribing the outer layer of the cable.

It is a further object of this invention to provide a cable scribing tool which, while fulfilling the above object, is capable of proper use on cables of varying diameters.

It is a still further object of this invention to provide a cable scribing tool which, while fulfilling the above objects, is extremely simple in design and convenient for use.

Broadly stated, the invention comprises a tool for scribing the outer surface of a cable or the like. Such tool comprises first and second pivotally connected arms having first and second extended ends respectively. Seating means are associated with the first extended end, a cable being seatable thereon between the first and second arms. A scriber blade is associated with the second extended end and is positioned to be brought into engagement with the outer surface of the cable when the cable is so seated and the first and second arms are pivoted relatively toward each other. Resilient means interconnect the first and second arms for urging the first and second arms together so that the cable therebetween is seated on the seating means and the blade is brought into engagement with the outer surface of the cable under the resilience of the resilient means. Means are included for selectively moving the first and second arms relatively apart against the resilience of the resilient means to allow insertion of the cable between and removal of the cable from between the arms.

BRIEF DESCRIPTION OF THE DRAWINGS

These and other objects of the invention will become apparent from a study of the following specification and drawings, in which:

FIG. 1 is a side sectional elevation of the inventive tool;

FIG. 2 is a sectional view taken along the line II—II of FIG. 1;

FIG. 3 is an enlarged sectional view of a portion of the tool as shown in FIG. 1;

FIG. 4 is a sectional view taken along the lines IV—IV of FIG. 3;

DESCRIPTION OF THE PREFERRED EMBODIMENT

Figure 6:
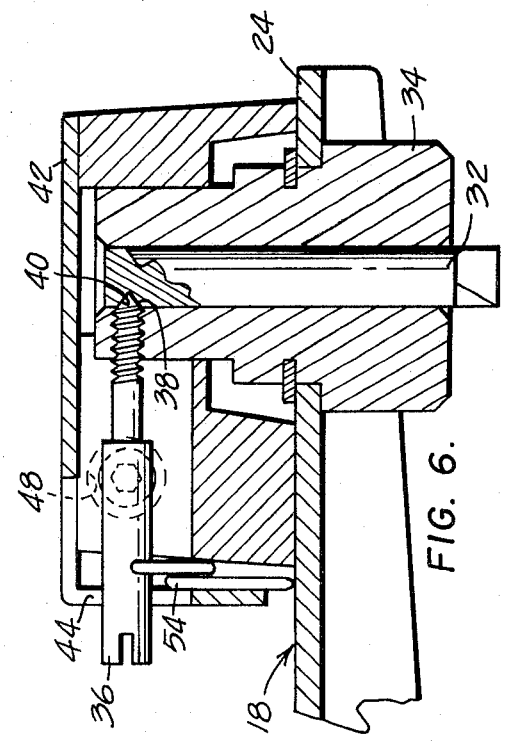
FIG. 6 is a sectional view taken along the line VI—VI of FIG. 5.

Referring to the drawings, a tool 10 is shown which is designed to scribe covering, which may be for example insulation or semi-conductor material, which makes up the outer surface 12 of a large diameter cable 14. The tool 10 is made up of first and second arms 16,18 which are pivotally connected by means of a pin 20. The arms 16,18 have extended ends 22,24 respectively which extend away from the pivot pin 20. The extended end 22 has fixed thereto seating means 26 made up of substantially flat seat members 28,30 at substantially right angles as shown.

Figure 5:
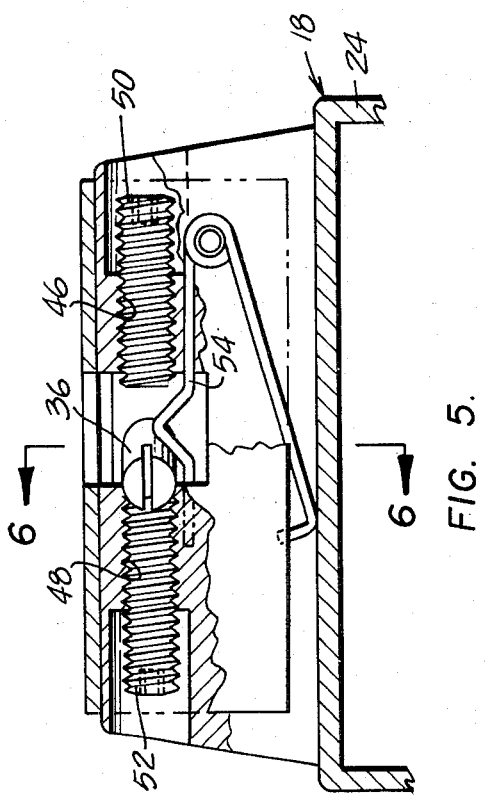
FIG. 5 is an enlarged end view, partially broken away, of the tool.

A scriber blade 32 is associated with the extended end 24 by means shown in FIGS. 5 and 6. The blade 32 is disposed within a holding element 34. A lug 36 is threadably engaged with a threaded aperture in the holding element 34, and the inwardly extending end 38 of the lug 36 seats in a cavity 40 in the body of the blade 32 to position the blade 32 relative to the holding element 34. The holding element 34 is associated with the extended end 24 so as not to be movable relative to the arm 18 generally along the longitudinal axis of the blade 32. A housing 42 is fixed to the extended end 24 and substantially covers this assembly, with lug 36 extending outwardly of the housing 42 through a slot 44 therein.

It will be seen that by moving the extended end of the lug 36 about the longitudinal axis of the body of the blade 32, the angular disposition of the blade 32 relative to the arm 18 (and thus relative to the cable 14 on which the blade 32 will operate) can be varied.

The housing 42 defines threaded bores 46,48 on either side of the lug 36. Threaded insert members 50,52 are disposed in the bores 46,48 respectively and extend to adjacent the lug 36. The extreme positions of the lug 36 in one direction or the other (which determines the limits of the angularity of the blade 32 relative to the cable 14) are determined by turning these inserts 50,52 in these bores 46,48 inwardly or outwardly thereof. A spring member 54 is included as shown to hold the lug 32 in the position chosen.

Fixed to the arm 18 adjacent the pivot pin 20 is one end of a leaf spring 56. Such leaf spring 56 interconnects the arms 16,18, extending under a pin 58 fixed to the arm 16, the spring 56 being dispsosed in sliding and bearing relationship with the pin 58. The leaf spring 56, in such state, urges the arms 16,18 relatively together.

Jack means 60 (FIGS. 1–4) are associated with the arms 16,18 for selectively moving the arms 16,18 relatively apart against the resilience of the resilient means 56. Such jack means 60 include a first jack member 62 made up of an internal member 64 and a knob 66 fixed thereto. The internal member 64 defines an internally threaded bore 68 the axis of which extends generally toward the arm 18. The jack member 62 is rotatable about the longitudinal axis of the bore 68 by means of the knob 66 but is generally limited from movement along the longitudinal axis of the bore 68. A second jack member 70 defines an outer threaded portion 72 in threaded engagement with the threaded bore 68, and extends to adjacent the arm 18.

The second jack member 70 includes an upper portion 74 defining substantially flat, parallel sides 76,78

(FIG. 4). These sides 76,78 are in close relation with inner side walls 80,82 defined by a bracket 84 which is fixed relative to the arm 18. Such means as disclosed, it will be seen, limit the movement of the second jack member 70 about the longitudinal axis of the bore 68, so that rotation of the knob 66 in one direction moves the second jack member 70 along the longitudinal axis of the bore 68 to move the arms 16,18 apart, the rotation of the knob 66 in the other direction retracting the second jack member 70 into the first jack member 62, to allow the arms 16,18 to move relatively toward each other under the resilience of the leaf spring 56. A pin 86 is disposed through the upper portion 74 of the second jack member 70 on the side of the bracket 84 removed from the first jack member 62, so that the second jack member 70 is retained in proper position for operation relative to the bracket 84.

In the use of the device, the arms 16,18 are spread by rotating the knob 66 in one direction, the jack means 60 acting as above to so effect such spreading. The cable 14 may then be inserted relative to and between the arms 16,18. The cable 14 is seatable on the seating means 26, between the arms 16,18, and the knob 66 is rotated to allow the arms 16,18 to be pivoted relatively toward each other under the resilience of the spring 56. The scriber blade 32 is brought into engagement with the outer surface 12 of the cable 14 during such operation. The angular position of the blade 32 relative to the cable 14 may be chosen by positioning of lug 36 as described above. The tool 10 is then rotated relative to the cable 14 about the longitudinal axis of the cable 14. During such rotation, the blade 32 scribes the insulation, semiconductor material, or the like, which defines the outer surface 12 of the cable 14.

The tool 10 may be removed upon completion of such scribing by rotation of the knob 66 to bring the jack means 60 into effect to move the arms 16,18 relatively apart.

Figure 7:
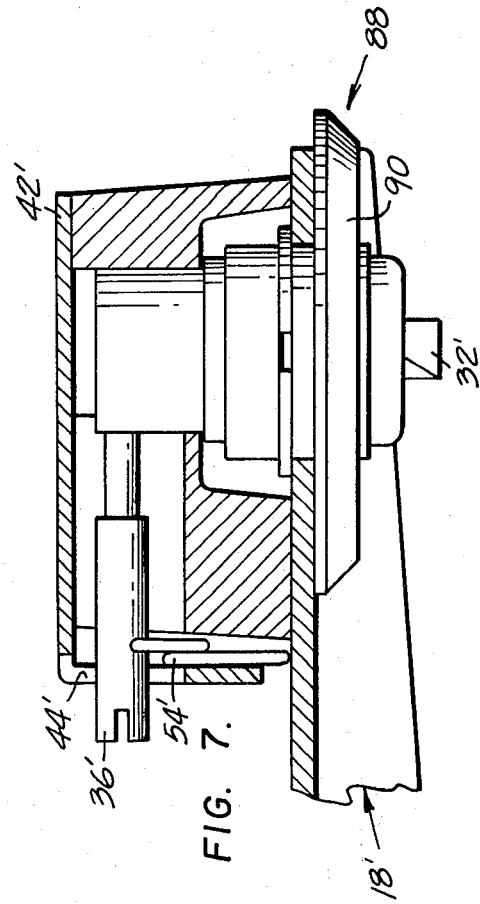
FIG. 7 is a sectional view similar to that shown in FIG. 6, but showing modifications to the tool.

In FIGS. 1–6, the scriber blade 32 is shown as being non-adjustable for depth of cut. However, it will be understood that means 88 (FIG. 7) may be included for varying the depth of cut thereof by varying the extent to which the scriber blade 32' protrudes relative to arm 18'. Such means 88 may with advantage include a varying dial 90, and may with further advantage incorporate the adjusting structure associated therewith as disclosed in my copending application entitled "Cable Stripping Tool," Ser. No. 355,957, filed Apr. 30, 1973. Such variation may be made without departing from the spirit of the invention.

We claim:

1. A tool for scribing the outer surface of a cable or the like comprising: first and second pivotally connected arms having first and second extended ends respectively; seating means associated with the first extended end and on which the cable is seatable between the first and second arms; a scriber blade associated with the second extended end and positioned to be brought into engagement with the outer surface of the cable when the cable is so seated and the first and second arms are pivoted relatively toward each other; resilient means interconnecting the first and second arms for urging the first and second arms together so that the cable therebetween is seated on said seating means and said blade is brought into engagement with the outer surface of the cable under the resilience of said resilient means; and means for selectively moving the first and second arms relatively apart against the resilience of the resilient means to allow relative insertion of the cable between and removal of the cable from between the arms, wherein the resilient means comprise a leaf spring interconnecting the first and second arms, wherein the leaf spring has one end thereof fixed to the second arm and the other end extending under a pin fixed to the first arm and disposed in bearing and sliding relation with said pin, wherein the means for selectively moving the first and second arms relatively apart comprise jack means associated with the first and second arms, and wherein said jack means comprise a first jack member associated with the first arm and defining an internally threaded bore, the first jack member being rotatable about the longitudinal axis of the bore and being generally limited from movement along said longitudinal axis of the bore, and a second jack member defining an outer threaded portion in threaded engagement with the threaded bore, the second jack member extending to adjacent the second arm, and movable along the longitudinal axis of the bore upon rotation of the first jack member, the jack means further comprising means for limiting the movement of the second jack member about the longitudinal axis of the bore, so that rotation of the first jack member in one direction moves the second jack member along the longitudinal axis of the bore to move the first and second arms relatively apart, and rotation of the first jack member in the other direction allows the first and second arms to move relatively toward each other under the resilience of the leaf spring.

2. The tool of claim 1 wherein the means for limiting the movement of the second jack member about the longitudinal axis of the bore comprise a bracket fixed relative to the second arm and defining first and second inner side walls positioned in close relation with first and second sides of the second jack member.

3. A tool for scribing the outer surface of a cable or the like comprising: first and second pivotally connected arms having first and second extended ends respectively; seating means associated with the first extended end and on which the cable is seatable between the first and second arms; a scriber blade associated with the second extended end and positioned to be brought into engagement with the outer surface of the cable when the cable is so seated and the first and second arms are pivoted relatively toward each other; resilient means interconnecting the first and second arms for urging the first and second arms together so that the cable therebetween is seated on said seating means and said blade is brought into engagement with the outer surface of the cable under the resilience of said resilient means; and means for selectively moving the first and second arms relatively apart against the resilience of the resilient means to allow relative insertion of the cable between and removal of the cable from between the arms, wherein the means for selectively moving the first and second arms relatively apart comprise jack means associated with the first and second arms, and wherein the jack means comprises a first jack member associated with the first arm and defining an internally threaded bore, the first jack member being rotatable about the longitudinal axis of the bore, and generally limited for movement along said longitudinal axis of the bore, and a second jack member defining an outer threaded portion in threaded engagement with the threaded bore, the second jack member extending to adjacent the second arm, and movable along the longitudinal axis of the bore upon rotation of the first jack member, the jack means further comprising means for limiting the movement of the second jack member about the longitudinal axis of the bore, so that rotation of the first jack member in one direction moves the second jack member along the longitudinal axis of the bore to move the first and second arms relatively apart, and rotation of the first jack member in the other direction allows the first and second arms to move relatively toward each other under the resilience of the resilient means.

4. The tool of claim 3 wherein the means for limiting movement of the second jack member about the longitudinal axis of the bore comprise a bracket fixed relative to the second arm and defining first and second inner side walls positioned in close relation with first and second sides of the second jack member.

* * * * *